United States Patent Office 2,764,061
Patented Sept. 25, 1956

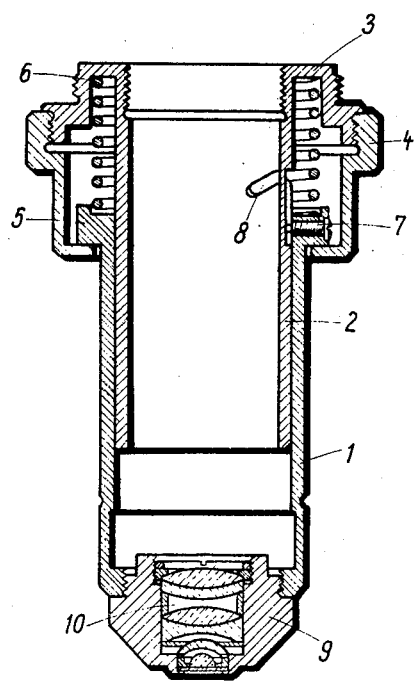

2,764,061
MICROSCOPE OBJECTIVE

Walter Kinder and Gustav Zieher, Heidenheim (Brenz), Aalen, Germany, assignors to Carl Zeiss, Heidenheim (Brenz), Germany Application July 13, 1950, Serial No. 173,546

1 Claim. (Cl. 88—39)

With highly magnifying microscope objectives, in which the working distance is only small, there frequently exists the danger that during focusing the object be touched and either the object or the front lens of the objective be injured. Moreover with immersion objectives the small working distance makes difficult working with the immersion fluid. If e. g. the immersion objective is used on a revolver interchangeably with other objectives, then it is desirable, that in changing objectives a refocusing of the microscope does not become necessary. However, it happens ever again in swinging in the immersion objective already provided with a drop of oil, that because of the small working distance the oil is smeared and the immersion must be prepared anew, which, under circumstances, requires a refocusing of the microscope.

According to the invention these disadvantages resulting from the small working distance are avoided thereby that the objective mounting comprises two tubular portions the first being detachably mounted to the nosepiece of the microscope and the other being fitted over and shiftable against the first portion parallel to the optical axis of the microscope and carrying the objective lenses. The shifting is effected against the pressure of a spring until the position with the small working distance of the lens system is reached, while locking means are arranged between said tubular portions, which allow holding the lens system carrying portion in another position of a larger distance for purposes of saving the lens system and the object from being damaged upon turning the objective revolver.

A locking means especially suitable consists in a bayonet lock, other locking means, however, may be used, e. g. little balls coacting with springs and engaging grooves.

In the annexed drawing and in the description belonging thereto, from which further details of the invention appear, a microscope objective mount developed in accordance with the invention is more closely explained by an example.

The mount of the objective shown in the drawing consists of two tubes 1 and 2 placed one within the other. Tube 1 embraces tube 2 and carries in its lower end the lenses. Tube 2 is to be fastened to the microscope nose piece in the known manner. The upper end of tube 2 has an extension 3 provided with threads. One thread is to screw into the microscope, while the other thread takes a screw-on cap 4. This screw-on cap insures against a falling out of the tube 1, which for this purpose is provided with a shoulder 5. Parts 1, 2, 3, and 4 form a hollow space in which a helical spring 6 is located so that one end thereof rests against shoulder 5, while the other end thereof rests against part 3. The spring always pushes the tube 1 into its position of use. Further a bayonet lock is provided, covered by cap 4. This lock consists essentially of a shaft screw 7 which, when the tube 1 is pushed upwards and given a short turn, engages a corresponding cutout 8 in tube 2 and thus locks the objective in its raised position. Through a slight lifting and a small turn the objective can again be unlocked and brought into its position of use.

This arrangement has e. g. the advantage for immersion objectives, that with the microscope prefocused the immersion fluid can be applied. To do so one only needs to push tube 1 up and if necessary lock it in the upper position. After unlocking, it automatically slides back into its position of use. With an immersion objective mounted on a revolver one can likewise lock the objective for the time being in its upper position and swing the revolver, so that a smearing of the immersion oil is avoided, while on the other hand e. g. in a series of microscope observations a refocusing of the microscope is not required in passing from one specimen to another.

We claim:

In a microscope an objective lens system and mounting elements therefor comprising two tubular portions, the first said portion being detachably mounted to the nosepiece of the microscope, the second said portion being fitted over said first portion and being shiftable in longitudinal direction parallel to the optic axis of said lens system and carrying said lens system at its front end directed towards the object to be observed, both said portions having flanges at their rear ends, a helically wound pressure spring arranged between said flanges for shifting said second portion with respect to said first portion towards the object into a first position of small observation distance between said lens system and the object to be observed, means for supporting said second portion in said first position, means for fixing said second portion against the action of said spring in a second position in which the distance between said lens system and the object to be observed is larger than in said first position, said means for supporting said second portion in said first position comprising a cap detachably mounted to the object side end of said first portion and having a flange lying against said second portion flange, said means for fixing said second portion in said second position consisting of a bayonet lock comprising a slot cut in the one said portion having a section parallel to the tubular portion axis and another section angularly bent at the rear end side of said portion, and a stem in the other said portion engaging with said slot.

References Cited in the file of this patent

UNITED STATES PATENTS

| | | |
|---|---|---|
| 775,934 | Patterson | Nov. 29, 1904 |
| 2,052,261 | Verschoor | Aug. 25, 1936 |
| 2,216,943 | Hanemann | Oct. 8, 1940 |
| 2,533,371 | Heine | Dec. 12, 1950 |

FOREIGN PATENTS

| | | |
|---|---|---|
| 19,842 | Great Britain | of 1891 |